(12) United States Patent
Morishima

(10) Patent No.: US 6,909,678 B2
(45) Date of Patent: Jun. 21, 2005

(54) METHOD OF CONSECUTIVE WRITING ON RECORDABLE DISC

(75) Inventor: Morito Morishima, Fukuroi (JP)

(73) Assignee: Yamaha Corporation, Hamamatsu (JP)

(*) Notice: Subject to any disclaimer, the term of this patent is extended or adjusted under 35 U.S.C. 154(b) by 444 days.

(21) Appl. No.: 10/086,276

(22) Filed: Mar. 1, 2002

(65) Prior Publication Data
US 2003/0198152 A1 Oct. 23, 2003

(30) Foreign Application Priority Data
Mar. 2, 2001 (JP) ......................................... 2001-057811

(51) Int. Cl.⁷ ............................................. G11B 5/09
(52) U.S. Cl. .................... 369/47.3; 369/47.28
(58) Field of Search ........................ 369/47.28, 47.3, 369/47.22, 47.27, 47.29, 47.31, 53.31, 53.34, 53.25, 59.23, 59.2, 59.19, 59.14

(56) References Cited

U.S. PATENT DOCUMENTS

| | | | | |
|---|---|---|---|---|
| 4,931,927 A | * | 6/1990 | Ishiwata et al. ......... | 369/53.22 |
| 6,522,608 B1 | * | 2/2003 | Kuroda ..................... | 369/47.28 |
| 6,584,053 B1 | * | 6/2003 | Tsukihashi ............... | 369/53.34 |
| 6,587,416 B1 | * | 7/2003 | Tsukihashi ............... | 369/47.28 |

* cited by examiner

Primary Examiner—Thang V. Tran
(74) Attorney, Agent, or Firm—Pillsbury Winthrop LLP

(57) ABSTRACT

A method is designed for writing new information subsequently to an end of previous information written in a track of a record medium having a pre-recorded signal along the track. The method is carried out by the steps of reading a part of the previous information including the end thereof to generate a read signal divided into a sequence of frames, start generating of a write signal in synchronization with a phase of the last frame of the read signal at the end of the previous information to thereby write the new information continuously from the end of the previous information, and then shifting a period of a frame of the write signal relative to a period of a synchronization signal contained in the pre-recorded signal, thereby gradually adjusting a phase of the frame of the write signal to a phase of the synchronization signal of the pre-recorded signal.

21 Claims, 9 Drawing Sheets

METHOD OF CONSECUTIVE WRITING ON RECORDABLE DISC

BACKGROUND OF THE INVENTION

The present invention relates to a recording method and a recording apparatus for a disc-type recording media such as an optical disc and other diverse types of recording media The present invention makes it possible to achieve next information to be written continuously from a recording end of previously recorded information, such that there will be less disturbance in synchronization at a write splicing position between the previous information and the subsequent information during reproduction.

When new information is additionally written, following a recording end of previous information in a successive recording type medium such as a recordable or rewritable optical disc, there may be a discontinuous state where a frequency of the recorded signal and a bit clock for reading of the recorded information do not coincide with each other. Otherwise, there may be a disagreement in phase between frames of the previously recorded information and the newly added information. In such a case, synchronization will be disturbed at the additional writing position with a resultant read error when the recorded information is reproduced after adding the new information. Thus, in the additional writing of new information, it is necessary to continuously write the new information in a continuous state where the recorded information agrees to the frequency of the bit clock, or there is an agreement in the phase of the frames of the recorded information. More preferably, these frequency and phase should be both in agreement between the preceding session and the succeeding session of the recorded information.

Referring to FIG. 2, a conventional method for additionally writing new information to a CD-R/RW disc (to a CD-R disc or a CD-RW disc) will be briefly described. A read signal (EFM signal) of recorded information of the CD-R/RW disc is supplied to a phase-locked loop circuit 10, and the phase thereof is compared, by a phase comparator 12, with that of a signal obtained by dividing an oscillation clock of a VCO (voltage control oscillator) 14 by a frequency divider 16 in a predetermined manner. A predetermined gain is imparted to the phase comparison output by an amplifier 18, and supplied to a control input terminal of the VCO 14 through the intermediary of a loop filter 20 to control the oscillation frequency and phase thereof This causes the VCO 14 to create a read clock synchronized to a bit clock of the read signal. The read signal is reproduced, using the read clock as an operating clock. In parallel to the creation of the read clock, ATIP information that has been recorded beforehand by FM modulation in the form of a pre-recorded signal in a wobble of a pre-groove is demodulated. A synchronization signal included in the demodulated ATIP information (if a synchronization signal is missing, then an interpolation signal produced by counting one cycle of the succeeding synchronization signal from the preceding synchronization signal) is supplied to a phase-locked loop circuit 22, and the phase thereof is compared, by a phase comparator 24, with the phase of the signal obtained by dividing an oscillation clock of a VCO 26 in a predetermined manner by a frequency divider 28. A predetermined gain is imparted to the phase comparison output by an amplifier 30, and supplied to a control input terminal of the VCO 26 through the intermediary of a loop filter 32 to control the oscillation frequency and phase thereof. This causes the VCO 26 to create a write clock synchronized to the synchronization signal of the ATIP information.

To perform additional writing, reading is started from a position before the recording end of recorded information, and the read signal is reproduced using the read clock. At a timing when the read position reaches the recording end of the previous information, a write signal is generated in synchronization with the write clock, and a laser beam of an optical pickup is modulated by the write signal to start writing. In this manner, the additional writing is performed. Spindle control is carried out on the basis of the read clock or the pre-recorded signal before the additional writing position is reached, then carried out on the basis of the pre-recorded signal after the additional writing position is reached. The spindle motor is phase-locked loop controlled so that these signals are obtained at predetermined frequencies.

Another conventional method for additionally writing new information to a CD-R/RW disc will be described with reference to FIG. 3. A read signal (EFM signal) of the recorded information of a CD-R/RW disc 34 is supplied to a phase-locked loop circuit 36, and the phase thereof is compared, by a phase comparator 38 with that of a signal obtained by dividing an oscillation clock of a VCO 40 by a frequency divider 42 in a predetermined manner. A predetermined gain is imparted to the phase comparison output by an amplifier 44, and supplied to a control input terminal of the VCO 40 through the intermediary of a loop filter 46 to control the oscillation frequency and phase of the VCO 40. This causes the VCO 40 to generate a read clock synchronized to a bit clock of the read signal. The read signal is reproduced, using the read clock as an operating clock.

A reference clock is issued from a clock oscillator 48. The reference clock is divided by a frequency divider 50 in a predetermined manner to create a signal having a frequency that corresponds to a wobble signal. A phase comparator 52 compares the phase of the divided reference clock with the phase of the wobble signal detected from the CD-R/RW disc 34. The phase comparison output controls a drive of a spindle motor 56 through the intermediary of a loop filter 54. Thus, the spindle motor 56 is controlled so that the wobble signal detected from the CD-R/RW disc 34 has a predetermined frequency. The reference clock issued from the clock oscillator 48 is divided in a predetermined manner by a frequency divider 58 to create a write clock.

To perform additional writing, reading is begun at a position before the recording end of the previous information while carrying out the spindle motor control based on the wobble signal, and the read signal is reproduced using the read clock. At a timing when the read position reaches the recording end of the previous information, a write signal is generated in synchronization with the write clock, and a laser beam of an optical pickup is modulated by the write signal to start writing. In this manner, the additional writing is performed.

According to the additional writing method based on the configuration shown in FIG. 2, the timing of the synchronization signal included in the ATIP information and the timing of a sub code frame synchronization signal of a read EFM signal of the recorded information do not necessarily coincide with each other (an error of −2 to +2 EFM frame is allowed according to Orange Book Standard). Therefore, new information to be recorded in synchronization with the synchronization signal included in the ATIP information is recorded with a deviation equivalent to the error from the recorded information preceding the additional writing position. When the disc that contains the additional writing is reproduced, the synchronization will be disturbed at the additional writing position, leading to a read error during the reproduction from time to time.

According to the additional writing method based on the configuration shown in FIG. 3, even when the reference clock is used to control the spindle motor 56, the revolution thereof develops a wow flutter, and wow flutter components are superposed on the read signal. For this reason, the read clock generated from the read signal and the write clock generated from the reference clock will have a deviation due to the wow flutter frequency and phase. Hence, when the disc in which additional writing has been performed is played back, the synchronization is disturbed at the additional writing position, resulting in a read error during playback from time to time.

There is still another conventional method for additional writing disclosed in Japanese Unexamined Patent Publication No. 2000-40302. However, the oscillation frequency of a VCO varies when additional writing is begun, causing synchronization to be disturbed at an additional writing position, leading to a possibility of the occurrence of a read error during reproduction.

SUMMARY OF THE INVENTION

The present invention has been made with a view of the above problems, and it is an object thereof to provide a recording method and a recording apparatus for disc type recording media such as optical discs and other various types of recording media, that permits additional writing to be achieved continuously. When new information is additionally written, following a recording end of previous information, there will be less disturbance in synchronization at an additional writing position during reproduction.

An inventive method is designed for writing new information subsequently to an end of previous information written in a track of a record medium having a pre-recorded signal along the track. The method comprises the steps of reading a part of the previous information including the end thereof to generate a read signal divided into a sequence of frames, start generating of a write signal in synchronization with a phase of the last frame of the read signal at the end of the previous information to thereby write the new information continuously from the end of the previous information, and then shifting a period of a frame of the write signal relative to a period of a synchronization signal contained in the pre-recorded signal, thereby gradually adjusting a phase of the frame of the write signal to a phase of the synchronization signal of the pre-recorded signal.

With this arrangement, the write signal is generated according to the phase of the frame of the read signal of the recording end of the previous information to start writing of the write signal, following the recording end of the previous information. Hence, it is possible to additionally write new information in continuance from the recording end of the previous information with a smaller phase error, and when a recording medium in which the additional writing has been performed is played back, the disturbance in the synchronization at the additional writing position will be reduced, allowing read errors to be reduced.

Furthermore, the period or cycle of the frame of the write signal is changed by a very small amount relative to the period or cycle of the synchronization signal of the pre-recorded signal after the writing is started so as to gradually adjust the phase of the frame of the write signal to the phase of the synchronization signal of the pre-recorded signal. This makes it possible to perform writing while gradually adjusting the phase of the frame of the write signal to the phase of the synchronization signal of the pre-recorded signal without causing the synchronization to be disturbed during the reproduction or playback of the recorded information.

In detail, according to the inventive method, the reading of a part of the previous information is carried out in response to a read clock derived from the previous information, the generating of the write signal is carried out in response to a write clock derived from the pre-recorded signal, such that a number of the write clock is shifted relative to the period of the synchronization signal of the pre-recorded signal to thereby gradually adjust the phase of the frame of the write signal to the phase of the synchronization signal of the pre-recorded signal.

An inventive apparatus is capable of writing new information subsequently to an end of previous information written in a track of a record medium embedded with a pre-recorded signal along the track. The inventive apparatus comprises a phase-locked loop circuit that generates a read clock for reading of the previous information and a write clock for writing of the new information, and a control circuit that controls the phase-locked loop circuit to effect smooth continuation from the previous information to the new information. The phase-locked loop circuit comprises a VCO that oscillates to generate an oscillating clock, a first phase comparator for comparing a phase of a read signal derived from the previous information with a phase of a clock signal derived from the oscillating clock so as to control the VCO based on phase-comparison between the read signal and the clock signal to thereby constitute a first loop of generating the read clock phase-locked to the read signal, a second phase comparator for comparing a phase of a synchronization signal derived from the pre-recorded signal with a phase of a clock signal derived from the oscillating clock so as to control the VCO based on phase-comparison between the synchronization signal and the clock signal to thereby constitute a second loop of generating the write clock phase-locked to the synchronization signal, the first loop and the second loop being switchable with respect to the VCO while the VCO maintaining the same frequency of the oscillating clock. The control circuit operates before starting the writing of the new information subsequent to the end of the previous information, for controlling the phase-locked loop circuit to activate the first loop to conduct the reading of a part of the previous information including the end thereof in synchronization to the read clock generated by the first loop, and then switching the phase-locked loop circuit to activate the second loop when the reading of the previous information reaches the end so as to conduct the writing of the new information in synchronization to the write clock generated by the second loop.

With this arrangement, since the phase-locked loop circuit is constructed such that the read clock generating loop and the write clock generating loop share the same VCO oscillation frequency, hence there will be less fluctuation in the VCO oscillation frequency when switching is made between these loops at the time of additional writing, thus making it possible to additionally write new information, following the recording end of previous information, with less fluctuation in the frequency of a bit clock. Hence, when a recording medium in which the additional writing has been performed is played back, the disturbance of synchronization at the additional writing position will be controlled, thereby permitting read errors to be reduced.

To be more specific, an inventive apparatus is capable of writing new information subsequently to an end of previous information written in a track of a record medium embedded with a pre-recorded signal along the track. The inventive apparatus comprises a phase-locked loop circuit that generates a read clock for reading of the previous information and a write clock for writing of the new information. The phase-locked loop circuit comprises a VCO that oscillates to generate an oscillating clock, a first phase comparator for comparing a phase of a read signal derived from the previous information with a phase of a clock signal derived from the oscillating clock so as to control the VCO based on phase-comparison between the read signal and the clock signal to thereby constitute a first loop of generating the read clock phase-locked to the read signal, a second phase comparator for comparing a phase of a synchronization signal derived from the pre-recorded signal with a phase of a clock signal derived from the oscillating clock so as to control the VCO based on phase-comparison between the synchronization signal and the clock signal to thereby constitute a second loop of generating the write clock phase-locked to the synchronization signal, the first loop and the second loop being switchable with respect to the VCO while the VCO maintaining the same frequency of the oscillating clock, a detecting circuit that detects the phase of each frame of the read signal derived from the previous information, a generating circuit that generates a write signal representative of the new information in synchronization to the oscillating clock generated from the VCO, and a control circuit that operates before starting the writing of the new information subsequent to the end of the previous information for controlling the phase-locked loop circuit to activate the first loop to conduct the reading of a part of the previous information including the end thereof in synchronization to the read clock generated by the first loop, and then operates when the reading of the previous information reaches the end for controlling the generating circuit to generate the write signal in matching with the phase of the last frame of the read signal detected at the end of the previous information to thereby start the writing of the new information in continuation from the end of the previous information and for switching the phase-locked loop circuit to activate the second loop.

In this case, the apparatus may further comprise a divider for dividing the oscillating clock fed from the VCO by a variable division ratio to produce the clock signal fed to the second phase comparator, a third phase comparator for comparing a phase of each frame of the write signal with a phase of the synchronization signal derived from the pre-recorded signal to determine a phase difference between the write signal and the synchronization signal, and an adjuster operative after the phase-locked loop circuit is switched from the first loop of generating the read clock to the second loop of generating the write clock for adjusting the variable division ratio of the divider so as to gradually absorb the phase difference.

Preferably, in the inventive apparatus, the control circuit operates when switching the phase-locked loop circuit from the first loop of generating the read clock to the second loop of generating the write clock, for resetting a phase of the clock signal fed to the second phase comparator in matching with a phase of the synchronization signal derived from the pre-recorded signal. With this arrangement, the fluctuations in the oscillation frequency and phase of the VCO at the time of switching between the loops can be further reduced.

Furthermore, the inventive apparatus comprises a pair of amplifiers connected to respective outputs of the first loop of generating the read clock and the second loop of generating the write clock for balancing loop gains between the first loop and the second loop. This arrangement makes it possible to restrain the fluctuation in a loop gain caused by switching between the loops so as to control mismatching in frequency or phase of the bit clocks of recorded information and additionally written information before and after an additional writing position.

Another inventive apparatus is capable of writing new information subsequently to an end of previous information written in a track of a record medium embedded with a pre-recorded signal along the track. The inventive apparatus comprises a read phase-locked loop circuit that generates a read clock for reading of the previous information, the read phase-locked loop circuit comprising a first VCO that oscillates to generate an oscillating clock, a first phase comparator for comparing a phase of a read signal derived from the previous information with a phase of a clock signal derived from the oscillating clock so as to control the first VCO based on phase-comparison between the read signal and the clock signal to thereby generate the read clock phase-locked to the read signal, a write phase-locked loop circuit that generates a write clock for writing of the new information, the write phase-locked loop circuit comprising a second VCO that oscillates to generate an oscillating clock, a second phase comparator for comparing a phase of the read clock generated by the read phase-locked loop circuit with a phase of a clock signal derived from the oscillating clock of the second VCO so as to control the second VCO based on phase comparison between the read clock and the clock signal to thereby constitute a first loop of synchronizing the oscillating clock of the second VCO with the read clock, and a third phase comparator for comparing a phase of a synchronization signal derived from the pre-recorded signal with a phase of a clock signal derived from the oscillating clock of the second VCO so as to control the second VCO based on phase-comparison between the synchronization signal and the clock signal to thereby constitute a second loop of generating the write clock phase-locked to the synchronization signal, the first loop and the second loop of the write phase-locked loop circuit being switchable with respect to the second VCO while the second VCO maintaining the same frequency of the oscillating clock, and a control circuit that operates before starting the writing of the new information subsequent to the end of the previous information for controlling the read phase-locked loop circuit to conduct the reading of a part of the previous information including the end thereof in synchronization to the read clock generated by the read phase-locked loop circuit while controlling the write phase-locked loop circuit to activate the first loop for synchronizing the oscillating clock of the second VCO with the read clock, and then switching the write phase-locked loop circuit to activate the second loop when the reading of the previous information reaches the end so as to conduct the writing of the new information in synchronization to the write clock generated by the second loop of the write phase-locked loop circuit.

With this arrangement, since the first loop phase-locked to the read clock and the second loop of generating the write clock share the same second VCO oscillation frequency. Therefore, there will be less fluctuation in the oscillation frequency of the second VCO when switching between these loops is made at the time of additional writing, and new information can be additionally written, following the recording end of the previous information with less fluctuation in bit clock frequency. Hence, when the recording medium in which the additional writing has been performed is played back, the disturbance in the synchronization at the additional writing position will be reduced, allowing read errors to be reduced.

To be more specific, an inventive apparatus is capable of writing new information subsequently to an end of previous information written in a track of a record medium embedded with a pre-recorded signal along the track. The inventive apparatus comprises a read phase-locked loop circuit that generates a read clock for reading of the previous information, the read phase-locked loop circuit comprising a first VCO that oscillates to generate an oscillating clock, a first phase comparator for comparing a phase of a read signal derived from the previous information with a phase of a clock signal derived from the oscillating clock so as to control the first VCO based on phase-comparison between the read signal and the clock signal to thereby generate the read clock phase-locked to the read signal, a write phase-locked loop circuit that generates a write clock for writing of the new information, the write phase-locked loop circuit comprising a second VCO that oscillates to generate an oscillating clock, a second phase comparator for comparing a phase of the read clock generated by the read phase-locked loop circuit with a phase of a clock signal derived from the oscillating clock of the second VCO so as to control the second VCO based on phase-comparison between the read clock and the clock signal to thereby constitute a first loop or synchronizing the oscillating clock of the second VCO with the read clock, and a third phase comparator for comparing a phase of a synchronization signal derived from the prerecorded signal with a phase of a clock signal derived from the oscillating clock of the second VCO so as to control the second VCO based on phase-comparison between the synchronization signal and the clock signal to thereby constitute a second loop of generating the write clock phase-locked to the synchronization signal, the first loop and the second loop of the write phase-locked loop circuit being switchable with respect to the second VCO while the second VCO maintaining the same frequency of the oscillating clock, a detecting circuit that detects the phase of each frame of the read signal derived from the previous information, a generating circuit that generates a write signal representative of the new information in synchronization to the oscillating clock generated from the second VCO, and a control circuit that operates before starting the writing of the new information subsequent to the end of the previous information for controlling the read phase-locked loop circuit to conduct the reading of a part of the previous information including the end thereof in synchronization to the read clock generated by the read phase-locked loop circuit while controlling the write phase-locked loop circuit to activate the first loop for synchronizing the oscillating clock of the second VCO to the read clock, and then operates when the reading of the previous information reaches the end for controlling the generating circuit to generate the write signal in matching with the phase of the last frame of the read signal detected at the end of the previous information to thereby start the writing of the new information in continuation from the end of the previous information and for switching the write phase-locked loop circuit to activate the second loop of generating the write clock.

The inventive apparatus further comprises a divider for dividing the oscillating clock fed from the second VCO by a variable division ratio to produce the clock signal fed to the third phase comparator, a fourth phase comparator for comparing a phase of each frame of the write signal with a phase of the synchronization signal derived from the pre-recorded signal to determine a phase difference between the write signal and the synchronization signal, and an adjuster operative after the write phase-locked loop circuit is switched from the first loop of synchronizing the oscillating clock to the second loop of generating the write clock for adjusting the variable division ratio of the divider so as to gradually absorb the phase difference.

The control circuit operates when switching the write phase-locked loop circuit from the first loop of synchronizing the oscillating clock to the second loop of generating the write clock, for resetting a phase of the clock signal fed to the third phase comparator in matching with a phase of the synchronization signal derived from the pre-recorded signal. With this arrangement, the fluctuations in the oscillation frequency and phase of the second VCO at the time of switching between the loops can be further reduced.

Furthermore, the inventive apparatus comprises a pair of amplifiers connected to respective outputs of the first loop of synchronizing the oscillating clock and the second loop of generating the write clock for balancing loop gains between the first loop and the second loop. This arrangement makes it possible to restrain the fluctuation in a loop gain caused by switching between the loops so as to control mismatching in frequency or phase of the bit clocks of recorded information and additionally written information before and after an additional writing position.

Still another inventive apparatus is capable of writing new information subsequently to an end of previous information written in a track of a record medium embedded with a pre-recorded signal along the track. The inventive apparatus comprises a read phase-locked loop circuit that generates a read clock for reading of the previous information, the read phase-locked loop circuit comprising a first VCO that oscillates to generate an oscillating clock, a first phase comparator for comparing a phase of a read signal derived from the previous information with a phase of a clock signal derived from the oscillating clock so as to control the first VCO based on phase-comparison between the read signal and the clock signal to thereby generate the read clock phase-locked to the read signal, a write phase-locked loop circuit that generates a write clock for writing of the new information, the write phase-locked loop circuit comprising a second VCO that oscillates to generate an oscillating clock, a selector for selecting one of a synchronization signal derived from the pre-recorded signal and a divisional signal frequency-divided from the read clock at the same frequency as the synchronization signal, and a second phase comparator for comparing a phase of the selected one of the synchronization signal and the divisional signal with a phase of a clock signal derived from the oscillating clock of the second VCO so as to control the second VCO based on phase-comparison between the selected signal and the clock signal to thereby generate the write clock phase-locked to the selected signal, and a control circuit that operates before starting the writing of the new information subsequent to the end of the previous information, for controlling the read phase-locked loop circuit to conduct the reading of a part of the previous information including the end thereof in synchronization to the read clock generated by the read phase-locked loop circuit while controlling the selector of the write phase-locked loop circuit to select the divisional signal or the read clock for synchronizing the oscillating clock of the second VCO with the read clock, and then controlling the selector of the write phase-locked loop circuit to select the synchronization signal when the reading of the previous information reaches the end so as to conduct the writing of the new information in synchronization to the write clock generated by the write phase-locked loop circuit.

With this arrangement, the read clock is divided so as to have the same frequency as that of the synchronization signal of the pre-recorded signal before it is supplied to the selector; therefore, there will be less fluctuation in the oscillation frequency of the second VCO when the selection by the selector is changed at the time of performing additional writing, so that the new information can be written, following the recording end of the previous information, with less fluctuation in the frequency phase of a bit clock. Hence, when the recording medium in which the additional writing has been performed is played back, the disturbance in the synchronization at the additional writing position will be reduced, allowing read errors to be reduced.

To be more specific, an inventive apparatus is capable of writing new information subsequently to an end of previous information written in a track of a record medium embedded with a pre-recorded signal along the track. The inventive apparatus comprises a read phase-locked loop circuit that generates a read clock for reading of the previous information, the read phase-locked loop circuit comprising a first VCO that oscillates to generate an oscillating clock, a first phase comparator for comparing a phase of a read signal derived from the previous information with a phase of a clock signal derived from the oscillating clock so as to control the first VCO based on phase-comparison between the read signal and the clock signal to thereby generate the read clock phase-locked to the read signal, a write phase-locked loop circuit that generates a write clock for writing of the new information, the write phase-locked loop circuit comprising a second VCO that oscillates to generate an oscillating clock, a selector for selecting one of a synchronization signal derived from the pre-recorded signal and a divisional signal frequency-divided from the read clock at the same frequency as the synchronization signal, and a second phase comparator for comparing a phase of the selected one of the synchronization signal and the divisional signal with a phase of a clock signal derived from the oscillating clock of the second VCO so as to control the second VCO based on phase-comparison between the selected signal and the clock signal to thereby generate the write clock phase-locked to the selected signal, a detecting circuit that detects the phase of each frame of the read signal derived from the previous information, a generating circuit that generates a write signal representative of the new information in synchronization to the oscillating clock generated from the second VCO, and a control circuit that operates before starting the writing of the new information subsequent to the end of the previous information for controlling the read phase-locked loop circuit to conduct the reading of a part of the previous information including the end thereof in synchronization to the read clock generated by the read phase-locked loop circuit while controlling the selector of the write phase-locked loop circuit to select the divisional signal of the read clock for synchronizing the oscillating clock of the second VCO with the read clock, and then operates when the reading of the previous information reaches the end for controlling the generating circuit to generate the write signal in matching with the phase of the last frame of the read signal detected at the end of the previous information to thereby start the writing of the new information in continuation from the end of the previous information and then controlling the selector of the write phase-locked loop circuit to select the synchronization signal for synchronization of the write clock.

In this case, the inventive apparatus further comprises a divider for dividing the oscillating clock fed from the second VCO by a variable division ratio to produce the clock signal fed to the second phase comparator, a third phase comparator for comparing a phase of each frame of the write signal with a phase of the synchronization signal derived from the pre-recorded signal to determine a phase difference between the write signal and the synchronization signal, and an adjuster operative after the selector of the write phase-locked loop circuit is switched from the divisional signal of the read clock to the synchronization signal of the pre-recorded signal for adjusting the variable division ratio of the divider so as to gradually absorb the phase difference.

In a more general aspect, an inventive apparatus is designed for writing new information subsequently to an end of previous information written in a track of a record medium embedded with a pre-recorded signal along the track. The inventive apparatus comprises a phase-locked loop circuit that generates a read clock for reading of the previous information and a write clock for writing of the new information, the phase-locked loop circuit including a VCO switchable between a first state where the VCO oscillates at a frequency in phase-locked relation with either of the read clock or a read signal derived from the previous information and a second state where the VCO oscillates in phase-locked relation with a synchronization signal derived from the pre-recorded signal for generating the write signal while maintaining the frequency of the oscillating, and a control circuit that controls the phase-locked loop circuit to effect smooth continuation from the previous information to the new information, wherein the control circuit operates before starting the writing of the new information for controlling the phase-locked loop circuit to conduct the reading of a part of the previous information including the end thereof in synchronization to the read clock while placing the VCO in the first state, and then operates when the reading of the previous information reaches the end for switching the VCO to the second state to conduct the writing of the new information in synchronization to the write clock generated from the VCO.

DETAILED DESCRIPTION OF THE EMBODIMENTS (First Embodiment)

Figure 1:
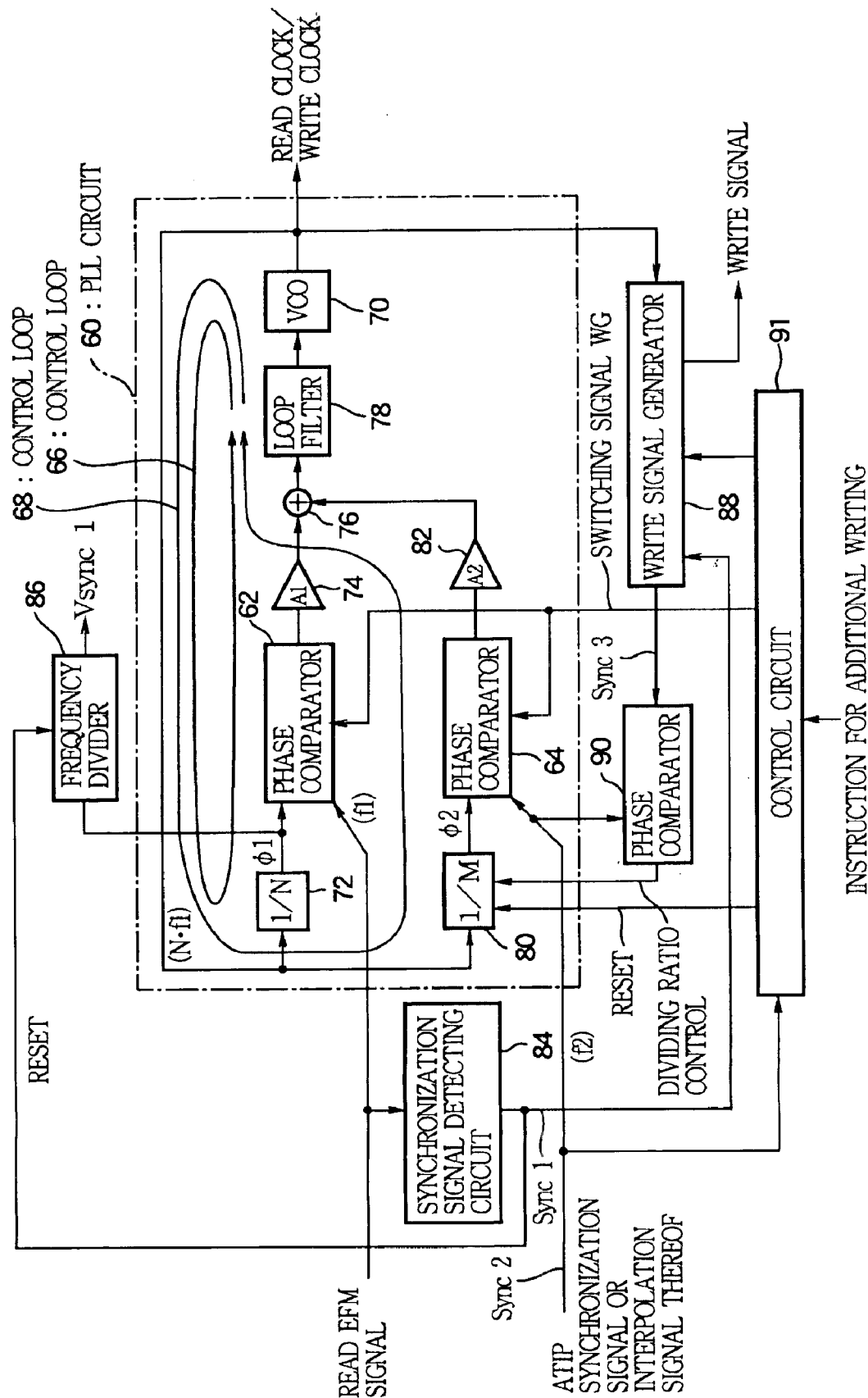
FIG. 1 is a block diagram showing the configuration of an essential part of a first embodiment of an apparatus for recording onto a recording medium.
Figure 2:
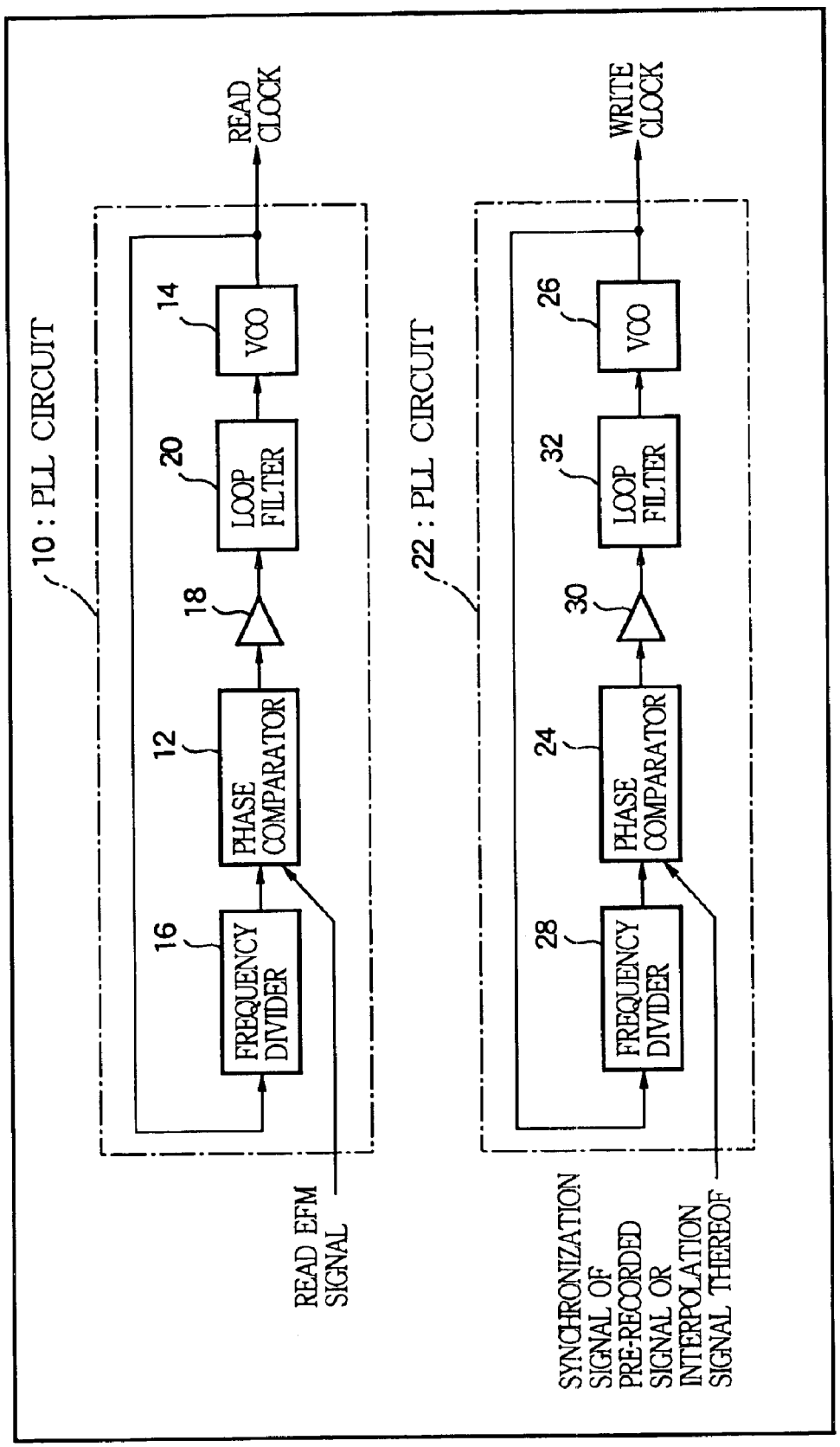
FIG. 2 is a block diagram showing the configuration of a conventional apparatus for recording onto a recording medium.
Figure 3:
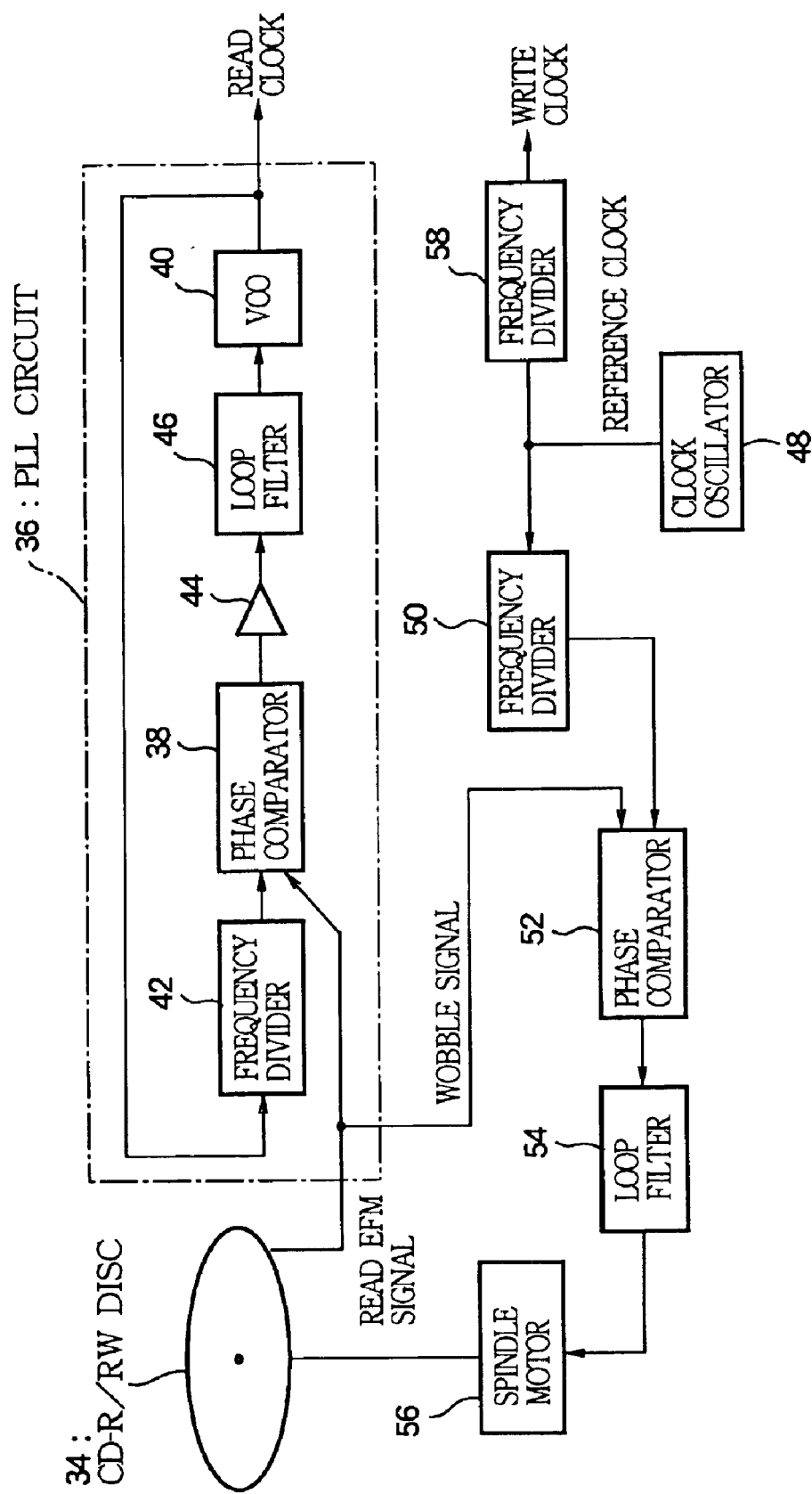
FIG. 3 is a block diagram showing the configuration of another conventional apparatus for recording onto a recording medium.

A first embodiment in which the present invention has been applied for recording onto a CD-R/RW disc will be described. FIG. 1 shows the configuration of an essential section of a CD-R/RW drive (a disc drive unit capable of writing to and reading from a CD-R disc and a CD-RW disc) to which the present invention has been applied. The CD-R/RW drive is designed to permit read clocks and write clocks to be produced by a single phase-locked loop circuit 60. The phase-locked loop circuit 60 is provided with a control loop 66 that passes through a phase comparator 62 and a control loop 68 that passes through a phase comparator 64. By a switching signal WG, the phase comparator 62 is turned ON and the phase comparator 64 is turned OFF so as to turn ON the control loop 66 and turn OFF the control loop 68, or the phase comparator 62 is turned OFF and the phase comparator 64 is turned ON so as to turn OFF the control loop 66 and turn ON the control loop 68.

The control loop 66 will be described. The phase comparator 62 compares the phase of a read signal (EFM signal) read from the CD-R/RW disc with the phase of a signal obtained by dividing, in a predetermined manner, an oscillation clock of a VCO (voltage control oscillator) 70 by a frequency divider 72 constructed by a counter or the like. An output of the phase comparison (a phase error output) is supplied to an amplifier 74 where a predetermined gain A1 is imparted thereto, input to a control input terminal of the VCO 70 via an adding point 76 and a loop filter 78, and controlled in the oscillation frequency and phase thereof. This causes the VCO 70 to issue a read clock synchronized to a bit clock of the read EFM signal. Using the read clock as an operating clock, normal reproduction and the reproduction of a read EFM signal at a position before reaching an additional writing position is performed.

The control loop 68 will be described. ATIP information recorded as a pre-recorded signal in advance by FM modulation in a wobble of a pregroove is demodulated by a demodulating circuit, which is not shown, and a synchronization signal included in the demodulated ATIP information (if a synchronization signal is missing, then an interpolation signal produced by counting one cycle of synchronization signal from the preceding synchronization signal) Sync 2 is supplied to the phase comparator 64. The phase comparator 64 compares the phase of the ATIP synchronization signal Sync 2 with the phase of the signal obtained by dividing an oscillation clock of the VCO 70 in a predetermined manner by a frequency divider 80 constructed by a counter or the like. A predetermined gain A2 is imparted to the phase comparison output by an amplifier 82, and supplied to a control input terminal of the VCO 70 through the intermediary of the adding point 76 and the loop filter 78 to control the oscillation frequency and phase thereof. This causes the VCO 70 to issue a write clock synchronized to the ATIP synchronization signal Sync 2. Using the write clock as an operating clock, a write signal is generated.

To perform additional writing, the VCO 70 is controlled first by the control loop 66, reading is begun from a position before the recording end of previous information, and the read signal is reproduced by using the clock issued from the VCO 70. At the timing when a read position reaches the recording end of the previous information, a write signal is generated in synchronization with the clock issued from the VCO 70, a laser beam of an optical pickup is modulated by the write signal to begin writing, then the control loop of the VCO 70 is switched to the control loop 68. In this manner, the additional writing is carried out. Spindle control is conducted on the basis of the read clock or a wobble signal or the ATIP synchronization signal Sync 2 before the additional writing position is reached, then conducted on the basis of the wobble signal or the ATIP synchronization signal Sync 2 after the additional writing position is reached. A spindle motor is phase-locked loop controlled so that these signals are obtained at predetermined frequencies.

The dividing ratio of the frequency divider 72 is set to an appropriate value N. When additional writing is performed, the oscillation frequency of the VCO 70 is controlled by the control loop 66 so that the standard value thereof is $N \cdot f1$ (f1 denotes a bit clock frequency standard value of the read EFM signal) before the additional writing position is reached. At this time, the frequency of an output signal $\phi 1$ of the frequency divider 72 is f1. A dividing ratio M of the frequency divider 80 is set such that the oscillation frequency of the VCO 70 does not fluctuate when switching between the control loops is made. More specifically, when the frequency standard value of the ATIP synchronization signal Sync 2 is denoted as f2, the dividing ratio M of the frequency divider 80 is set to $M = N \cdot f1/f2$. Thus, when the oscillation frequency of the VCO 70 is controlled to the standard value $N \cdot f1$ by the control loop 66 before the additional writing position is reached, the frequency of an output signal $\phi 2$ of the frequency divider 80 is f2, and when the control is switched to the control loop 68 after the additional writing position is reached, the oscillation frequency of the VCO 70 does not fluctuate. The frequency divider 80 is reset at the timing of the ATIP synchronization signal Sync 2 before the control loop is switched from the control loop 66 to the control loop 68. Hence, when the control loop is switched to the control loop 68 after the additional writing position is reached, an increase in the phase comparison output of the phase comparator 64 will be restrained, thus restraining the fluctuation in the frequency and phase of the oscillation clocks of the VCO 70.

The gains A1 and A2 of the amplifiers 74 and 82 are set to $A1:A2 = f2:f1$ so as to compensate for the difference in loop gain between the control loops 66 and 68 (the loop gain of the control loop 66 being higher than that of the control loop 68 by f1/f2) attributable to the difference between the frequencies f1 and f2 of the input signals of the phase comparators 62 and 64. This prevents a control voltage of the VCO 70 from fluctuating due to a difference in loop gain, which would cause the frequency and phase of the oscillation clock to be disturbed, when the control loop is changed from the control loop 66 over to the control loop 68 at the time of additional writing.

A synchronization signal detecting circuit 84 detects a sub code frame synchronization signal Sync 1 from the read EFM signal. The sub code frame synchronization signal Sync 1 is allowed to have an error of −2 to +2 EFM frame with respect to an ATIP synchronization signal Sync 2. A frequency divider 86 divides an output signal of the frequency divider 72 in accordance with a predetermined manner to produce an interpolation signal of the synchronization signal Sync 1, and counts one cycle of the synchronization signal Sync 1 from the detection timing of the synchronization signal Sync 1 so as to produce an interpolation signal Vsync 1. A write signal generator 88 generates a write signal in synchronization with an oscillation clock of the VCO 70. A sub code frame synchronization of the write signal generator 88 is reset by the sub code frame synchronization signal Sync 1 detected from the read signal before an additional writing position is reached. After the additional writing position is reached, the write signal generator 88 counts the oscillation clocks of the VCO 70 and produces a sub code frame synchronization by itself. From the write signal generator 88, a synchronization signal Sync 3 indicating the sub code frame synchronization is output. After the additional writing position is reached and the loop switching is performed, a phase comparator 90 compares the phase of the ATIP synchronization signal Sync 2 with the phase of the sub code frame synchronization signal Sync 3 of the write signal generator 88, and slightly changes the dividing ratio M of the frequency divider 80 to gradually reduce the phase difference (at a cycle later than the response time of the control loop 68). This gradually reduces the phase deviation of the sub code frame synchronization signal Sync 3 of the write signal with respect to the ATIP synchronization signal Sync 2 after loop switching is made. A control circuit 91 implements control necessary for additional writing on respective constituents when it receives an instruction for additional writing.

Figure 4:
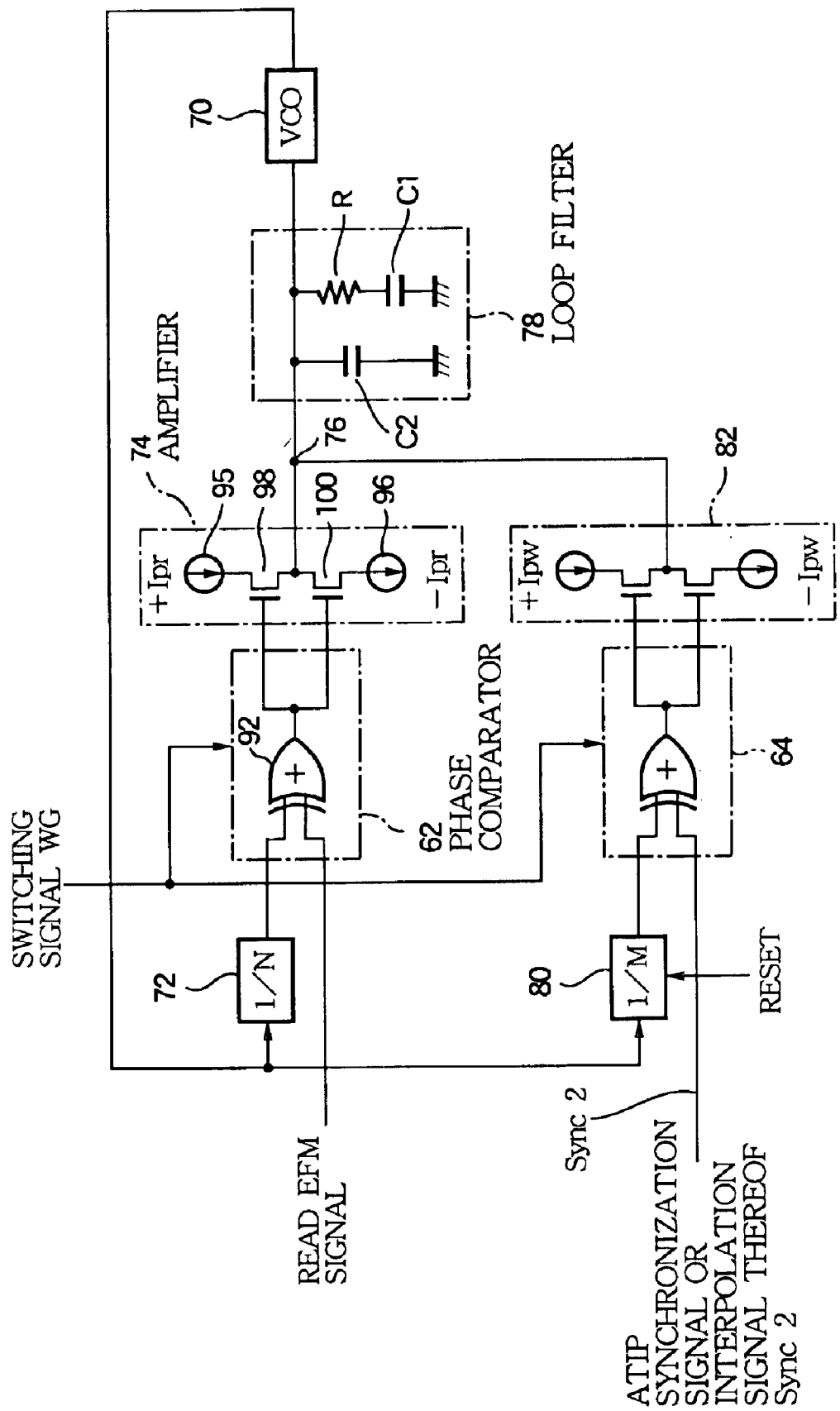
FIG. 4 is a circuit diagram showing a specific example of a phase-locked loop circuit of FIG. 1.
Figure 5:
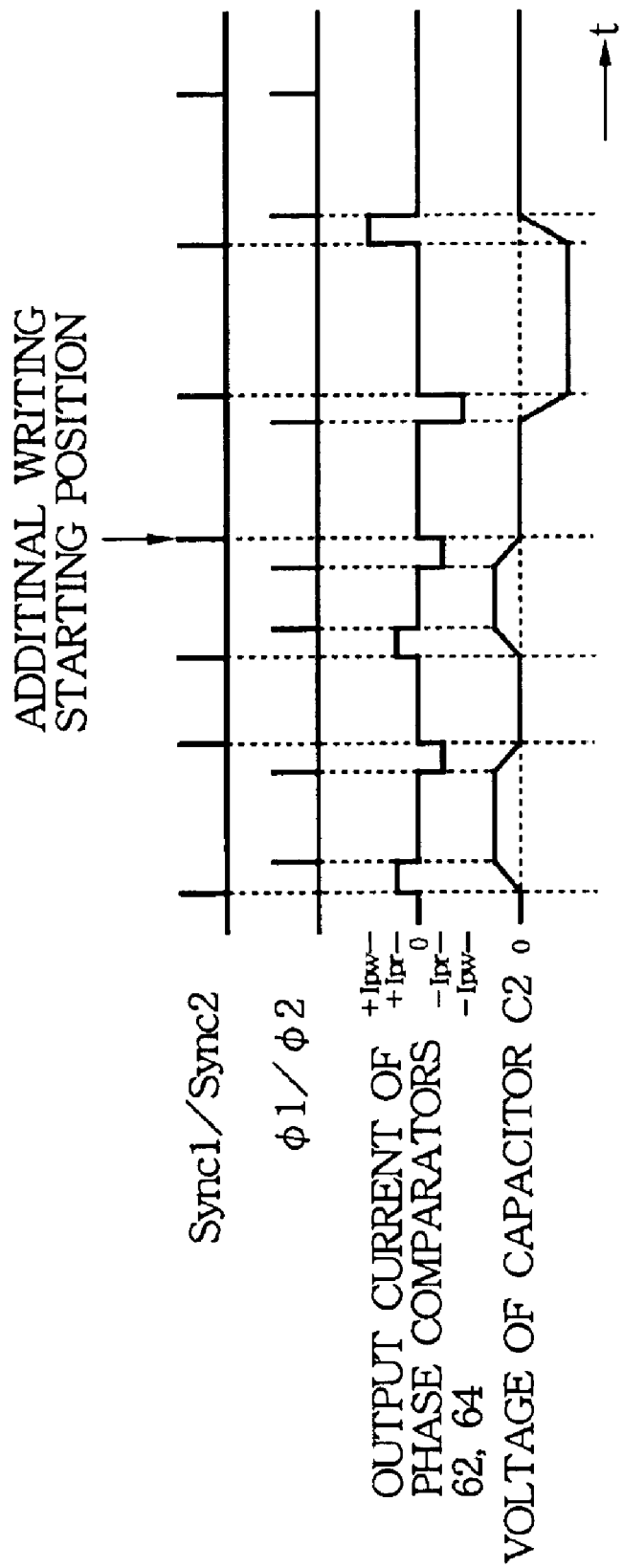
FIG. 5 is a diagram showing an operation waveform of the circuit of FIG. 4.

A specific example of the phase-locked loop circuit 60 is shown in FIG. 4. The phase comparator 62 supplies a read EFM signal and a comparison input φ1 to an exclusive OR circuit 92, and outputs the exclusive logic sum. The phase comparator 64 shares the same configuration as that of the phase comparator 62. The phase comparators 62 and 64 may alternatively be constructed by flip-flop circuits in place of the configuration shown in FIG. 4. The amplifier 74 is formed of transistors 98 (p-channel) and 100 (n-channel) in push-pull connection with constant-currant sources 95 and 96 disposed at both ends thereof, and outputs of the phase comparator 62 are respectively input to the gates of the transistors 98 and 100. The amplifier 82 shares the same configuration as that of the amplifier 74. Constant current values Ipr and Ipw of the amplifiers 74 and 82 arc set to Ipr:Ipw=f2:f1 when the bit clock frequency standard value of the read EFM signal is denoted as f2 and the frequency standard value of the ATIP synchronization signal Sync 2 is denoted as f2. This sets the gains A1 and A2 of the amplifiers 74 and 82 to A1:A2=f2:f1, compensating for the difference in loop gain between the control loops 66 and 68. The outputs of the amplifiers 74 and 82 are subjected to current addition at the adding point 76 before they are supplied to the loop filter 78. The loop filter 78 charges a capacitor C2 with a current output of the adding point 76, and applies the charge voltage to the control terminal of the VCO 70 to control the oscillation frequency of the VCO 70. A series circuit of a resistor R and a capacitor C1 in the loop filter 78 is a phase compensating circuit. FIG. 5 illustrates the operation of the circuit of FIG. 4. Here, a case is shown where f1:f2=A2:A1=2:1 as a matter of convenience.

Figure 6:
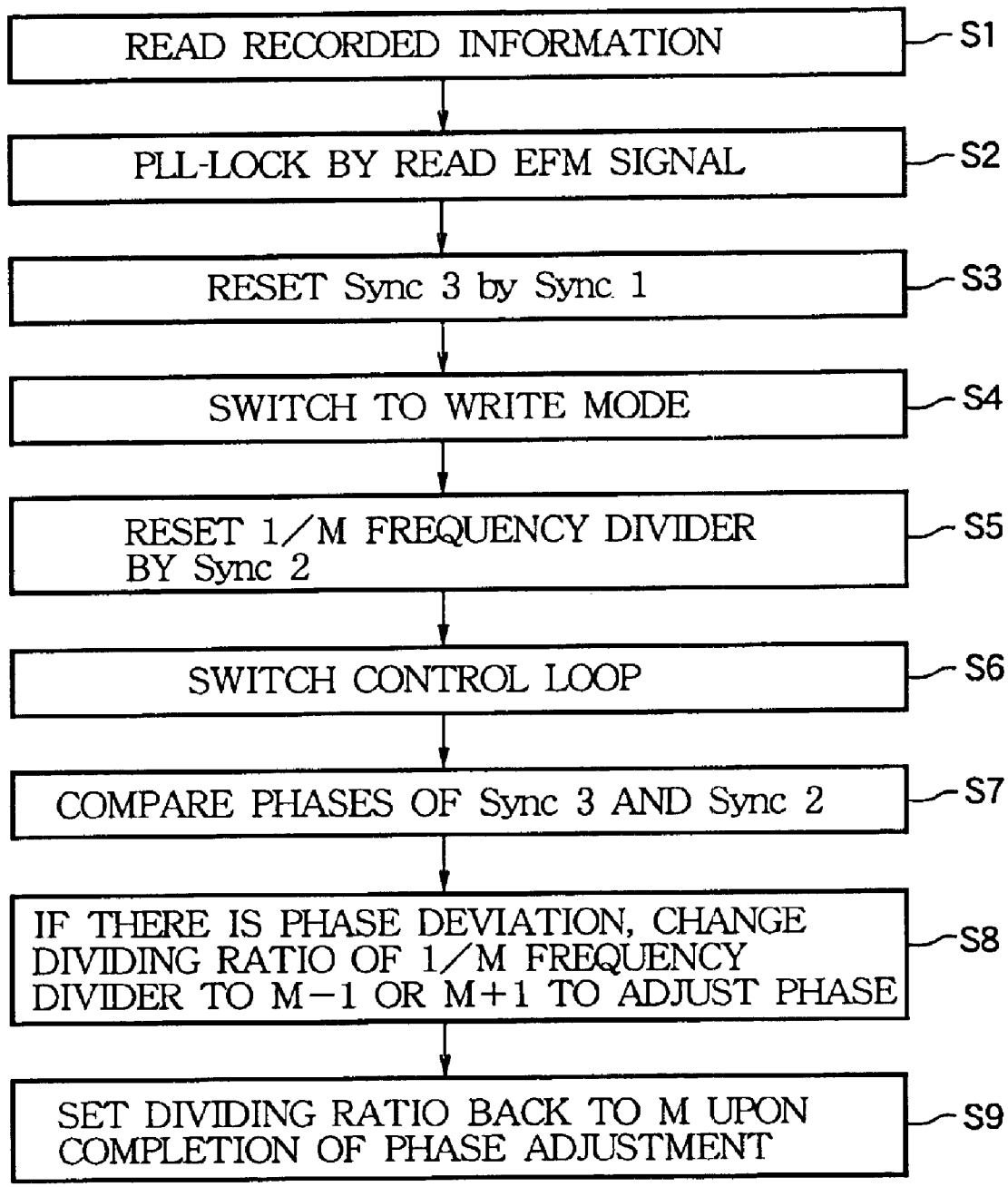
FIG. 6 is a flowchart illustrating the control for additional writing in a CD-R/RW drive of FIG. 1.
Figure 7:
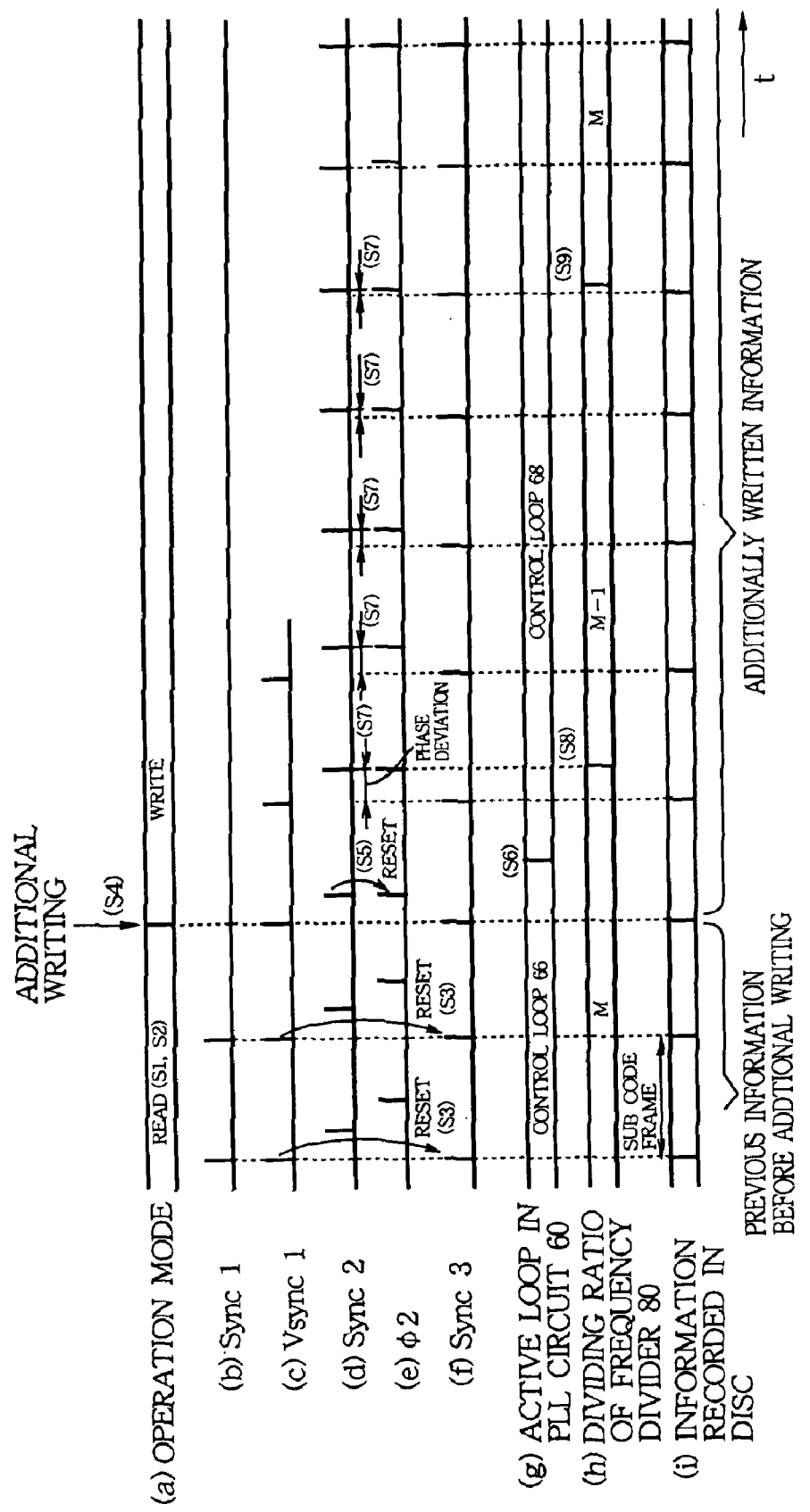
FIG. 7 is a time chart illustrating the operation for the additional writing in the CD-R/RW drive of FIG. 1.

The operation for additional writing under the control of the control circuit 91 of FIG. 1 will be described with reference to a flowchart of FIG. 6 and a time chart of FIG. 7. The operations corresponding to steps S1 through S9 of FIG. 6 will be denoted by the same reference numerals in FIG. 7. To perform additional writing, by using the switching signal WG, the phase comparator 62 is turned ON and the phase comparator 64 is turned OFF to turn ON the control loop 66 and turn OFF the control loop 68 so as to set the operation mode to a read mode. The spindle motor is controlled to a speed that provides a predetermined linear velocity to read the previous information, starting before the additional writing position (S1). This reading causes the phase-locked loop circuit 60 to be phase-locked to the read EFM signal, and the recorded information is reproduced, using the clock generated from the VCO 70 as a read clock (S2). The sub code frame synchronization signal Sync 3 of the write signal generated from the write signal generator 88 is reset by the sub code frame synchronization signal Sync 1 detected from the read EFM signal (S3). At a timing when the recording end of the previous information is reached, the operation mode is switched to a write mode, and a write signal is generated from the write signal generator 88 in synchronization with an oscillation clock of the VCO 70 to begin writing new information (S4). After switching to the write mode, the frequency divider 80 is reset by the first ATIP synchronization signal Sync 2, and the phase of the comparison input φ2 of the phase comparator 64 is matched to the phase of the ATIP synchronization signal Sync 2 (S5). Immediately after the frequency divider 80 is reset, the phase comparator 62 is turned OFF, while the phase comparator 64 is turned ON by the switching signal WG so as to turn the control loop 66 OFF and the control loop 68 ON (S6). When the switching of the control loop is performed, the frequencies and phases of the ATIP synchronization signal Sync 2 and its comparison input φ2 are substantially matched, and the loop gains are maintained equal by the switching of the amplifiers A1 and A2. Hence, the disturbance (fluctuations in frequency and phase) of the oscillation clocks of the VCO 70 caused by the switching a control loop will be controlled to a minimum.

Then, the phase of the sub code frame synchronization signal Sync 3 of the write signal and the phase of the ATIP synchronization signal Sync 2 are compared by the phase comparator 90 (S7), and the dividing ratio of the frequency divider 80 is slightly changed according to the phase error to perform phase adjustment at a cycle that is later than the response time of the control loop 68. More specifically, if the sub code frame synchronization signal Sync 3 advances by a predetermined amount or more with respect to the ATIP synchronization signal Sync 2, then the dividing ratio of the frequency divider 80 is changed from M to M−1 (S8) in order to slightly reduce the cycle of the comparison input φ2 to cause the oscillation frequency of the VCO 70 to be slightly reduced so as to gradually bring the phase of the sub code frame synchronization signal Sync 3 closer to the phase of the ATIP synchronization signal Sync 2. When the phase error between the sub code frame synchronization signal Sync 3 and the ATIP synchronization signal Sync 2 becomes to stay within a predetermined range, the dividing ratio of the frequency divider 80 is set back to M (S9). On the contrary, if the sub code frame synchronization signal Sync 3 delays by a predetermined amount or more with respect to the ATIP synchronization signal Sync 2, then the dividing ratio of the frequency divider 80 is changed from M to M+1 (S8) in order to slightly prolong the cycle of the comparison input φ2 to cause the oscillation frequency of the VCO 70 to be slightly increased so as to gradually bring the phase of the sub code frame synchronization signal Sync 3 closer to the phase of the ATIP synchronization signal Sync 2. When the phase error between the sub code frame synchronization signal Sync 3 and the ATIP synchronization signal Sync 2 becomes to stay within a predetermined range, the dividing ratio of the frequency divider 80 is set back to M (S9). As a result of the phase adjustment, the phase of the sub code frame synchronization signal Sync 3 of the write signal substantially coincides with the phase of the ATIP synchronization signal Sync 2. This completes the processing at the beginning of the additional writing, and the writing of new information immediately follows.

(Second Embodiment)

Figure 8:
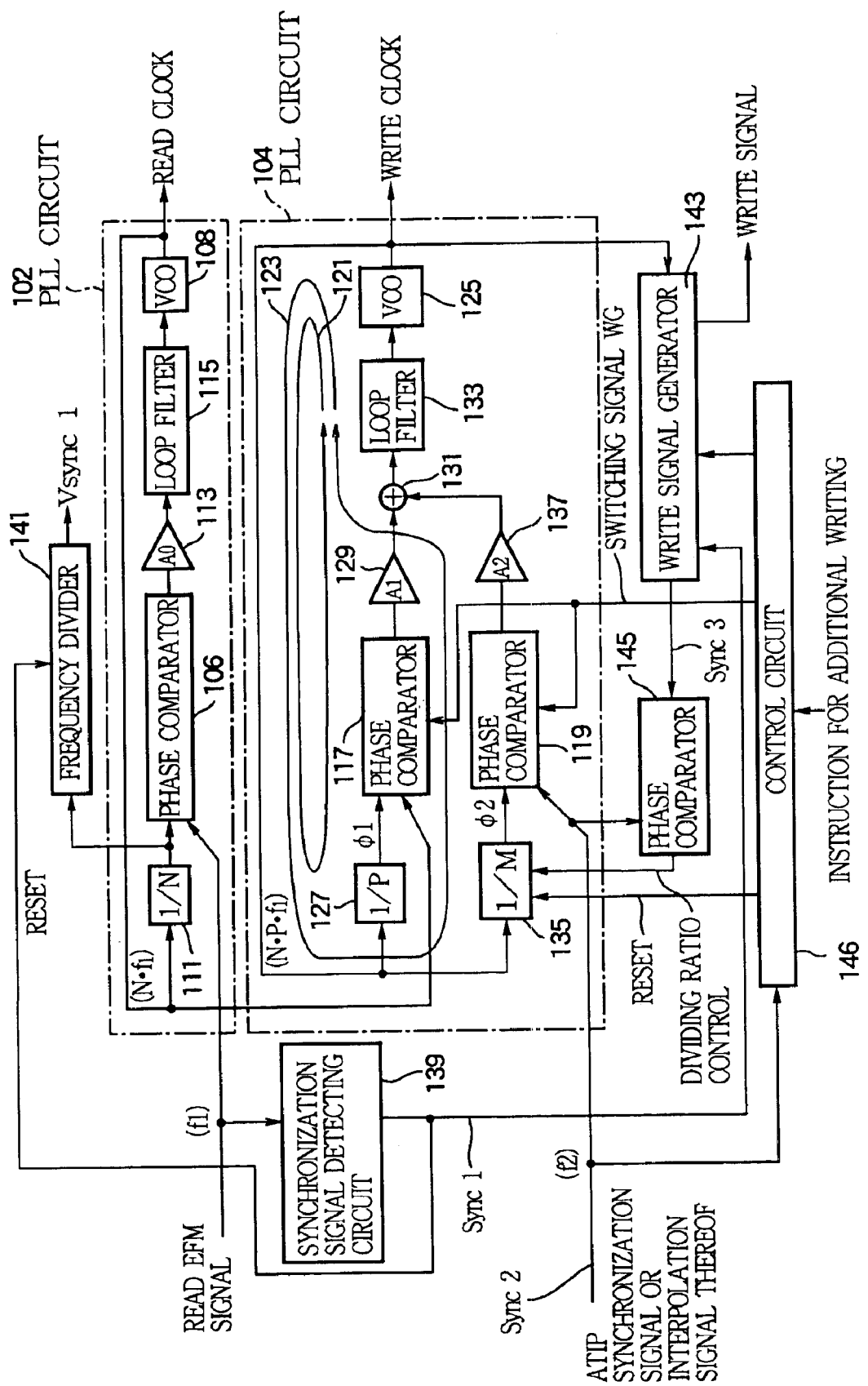
FIG. 8 is a block diagram showing the configuration of an essential part of a second embodiment of the apparatus for recording onto a recording medium in accordance with the present invention.

A second embodiment in which the present invention has been applied to recording in a CD-R/RW disc will be described. FIG. 8 shows the configuration of an essential section of a CD-R/RW drive to which the present invention has been applied. In this, a read clock producing phase-locked loop circuit 102 and a write clock producing phase-locked loop circuit 104 are separately constructed. According to this configuration, it is possible to design phase-locked loop circuits dedicated for producing read clocks and for producing write clocks, respectively, so that circuits that stably operate can be implemented.

The phase-locked loop circuit 102 will be described. A phase comparator 106 compares the phase of a read EFM signal read from the CD-R/RW disc and the phase of a signal obtained by dividing, in a predetermined manner, an oscillation clock of a VCO 108 by a frequency divider 111 constructed by a counter or the like. An amplifier 113 imparts a predetermined gain A0 to an output of the phase comparison, and the output is supplied to a control input terminal of the VCO 108 through the intermediary of a loop filter 115 to control the oscillation frequency and phase thereof. This causes the VCO 108 to issue a read clock synchronized with a bit clock of the read EFM signal. Using the read clock as an operating clock, normal reproduction and the reproduction of a read EFM signal before reaching an additional writing position are performed.

The phase-locked loop circuit 104 is provided with a control loop 121 that passes through a phase comparator 117 and a control loop 123 that passes through a phase comparator 119. By a switching signal WG, the phase comparator 117 is turned ON and the phase comparator 119 is turned OFF so as to turn ON the control loop 121 and turn OFF the control loop 123, or the phase comparator 117 is turned OFF and the phase comparator 119 is turned ON so as to turn OFF the control loop 121 and turn ON the control loop 123.

The control loop 121 will be described. The phase comparator 117 compares the phase of a read clock with the phase of a signal obtained by dividing, in a predetermined manner, an oscillation clock of a VCO 125 by a frequency divider 127 constructed by a counter or the like. An output of the phase comparison is supplied to an amplifier 129 where a predetermined gain A1 is imparted thereto, input to a control input terminal of the VCO 125 via an adding point 131 and a loop filter 133, and controlled in the oscillation frequency and phase thereof. This causes the VCO 125 to issue a clock synchronized to the read clock (read clock synchronization clock).

The control loop 123 will be described. ATIP information recorded as a pre-recorded signal in advance by FM modulation in a wobble of a pre-groove is demodulated by a demodulating circuit, which is not shown, and a synchronization signal included in the demodulated ATIP information (if a synchronization signal is missing, then an interpolation signal produced by counting one cycle of synchronization signal from the preceding synchronization signal) Sync 2 is supplied to the phase comparator 119. The phase comparator 119 compares the phase of the ATIP synchronization signal Sync 2 with the phase of a signal φ2 obtained by dividing an oscillation clock of the VCO 125 in a predetermined manner by a frequency divider 135 constructed by a counter or the like. A predetermined gain A2 is imparted to the phase comparison output by an amplifier 137, and supplied to a control input terminal of the VCO 125 through the intermediary of the adding point 131 and the loop filter 133 to control the oscillation frequency and phase thereof. This causes the VCO 125 to issue a write clock synchronized to the ATIP synchronization signal Sync 2. Using the write clock as an operating clock, a write signal is generated.

To perform additional writing, reading is started from a position before the recording end of previous information, and the read signal is reproduced using a read clock issued from the VCO 108 of the phase-locked loop circuit 102. At this time, the phase-locked loop circuit 104 first controls the VCO 125 by the control loop 121, then causes a write signal generator 143 to generate a write signal in synchronization with a clock, which is issued from the VCO 125, at a timing when the read position reaches the recording end of the previous information. A laser beam of an optical pickup is modulated by the write signal to start writing, then the control of the VCO 125 is switched to the control by the control loop 123. In this manner, the additional writing is performed. Spindle control is carried out on the basis of the read clock or a wobble signal or the ATIP synchronization signal Sync 2 before the additional writing position is reached, then carried out on the basis of the wobble signal or the ATIP synchronization signal Sync 2 after the additional writing position is reached. A spindle motor is phase-locked loop-controlled so that these signals are obtained at predetermined frequencies.

The dividing ratios of the frequency dividers 111 and 127 are set to appropriate values N and P, respectively. Before an additional writing position is reached, the oscillation frequency of the VCO 125 is controlled by the control loop 121 so that the standard value is N·P·f1 (f1 denotes a bit clock frequency standard value of the read EFM signal). At this time, the frequency of an output signal φ1 of the frequency divider 127 is N·f1. A dividing ratio M of a frequency divider 135 is set such that the oscillation frequency of the VCO 125 does not fluctuate when switching between the control loops is made. More specifically, when the frequency standard value of the ATIP synchronization signal Sync 2 is denoted as f2, the dividing ratio M of the frequency divider 135 is set to M=N·P·f1/f2. Thus, when the oscillation frequency of the VCO 125 is controlled to the standard value N·f1 by the control loop 121 before the additional writing position is reached, the frequency of an output signal φ2 of the frequency divider 135 is f2, and when the control is switched to the control loop 123 after the additional writing position is reached, the oscillation frequency of the VCO 125 does not fluctuate. The frequency divider 135 is reset at the timing of the ATIP synchronization signal Sync 2 before the control loop of the phase-locked loop circuit 104 is switched from the control loop 121 to the control loop 123. Hence, when the control loop is switched to the control loop 123 after the additional writing position is reached, an increase in the phase comparison output of the phase comparator 119 will be restrained, thus restraining the fluctuation in the frequency and phase of the oscillation clocks of the VCO 125.

The gains A1 and A2 of the amplifiers 129 and 137 are set to A1:A2=f2:N·f1 so as to compensate for the difference in loop gain between the control loops 121 and 123 (the loop gain of the control loop 121 being higher than that of the control loop 123 by N·f1/f2) attributable to the difference between the frequencies N·f1 and f2 of the comparison inputs φ1 and φ2 of the phase comparators 117 and 119. This prevents a control voltage of the VCO 125 from fluctuating due to a difference in loop gain, which would cause the frequency and phase of the oscillation clock to be disturbed, when the control loop is changed from the control loop 121 over to the control loop 123 at the time of additional writing.

A synchronization signal detecting circuit 139 detects a sub code frame synchronization signal Sync 1 from the read EFM signal. A frequency divider 141 divides an output signal of the frequency divider 111 in accordance with a predetermined manner to produce an interpolation signal of the synchronization signal Sync 1, and counts one cycle of the synchronization signal Sync 1 from the detection timing of the synchronization signal Sync 1 so as to produce an interpolation signal Vsync 1. A write signal generator 143 generates a write signal in synchronization with an oscillation clock of the VCO 125. A sub code frame synchronization of the write signal generator 143 is reset by the sub code frame synchronization signal Sync 1 detected from the read EFM signal before an additional writing position is reached. After the additional writing position is reached, the write signal generator 143 counts the oscillation clocks of the VCO 125 and produces a sub code frame synchronization by itself. From the write signal generator 143, a synchronization signal Sync 3 indicating the sub code frame synchronization is output. After the additional writing position is reached and the loop switching is performed, a phase comparator 145 compares the phase of the ATIP synchronization signal Sync 2 with the phase of the sub code frame synchronization signal Sync 3 of the write signal generator 143, and slightly changes the dividing ratio M of the frequency divider 135 to gradually reduce the phase difference (at a cycle later than the response time of the control loop 123). This gradually reduces the phase deviation of the sub code frame synchronization signal Sync 3 of the write signal with respect to the ATIP synchronization signal Sync 2 after loop switching is made. The phase-locked loop circuit 104 may be constructed in the same manner as shown in, for example, FIG. 4.

A control circuit 146 implements control necessary for additional writing on respective constituents when it receives an instruction for additional writing. The operation for the additional writing under the control of the control circuit 146 may be performed in the same manner as shown by the flowchart of FIG. 6 and the time chart of FIG. 7 described above {however, in FIG. 7, "phase-locked loop circuit 60" should read "phase-locked loop circuit 104", "Control loop 66" should read "Control loop 121", "Control loop 68" should read "Control loop 123" in (g), and "Frequency divider 80" should read "Frequency divider 135" in (h)}

(Third Embodiment)

Figure 9:
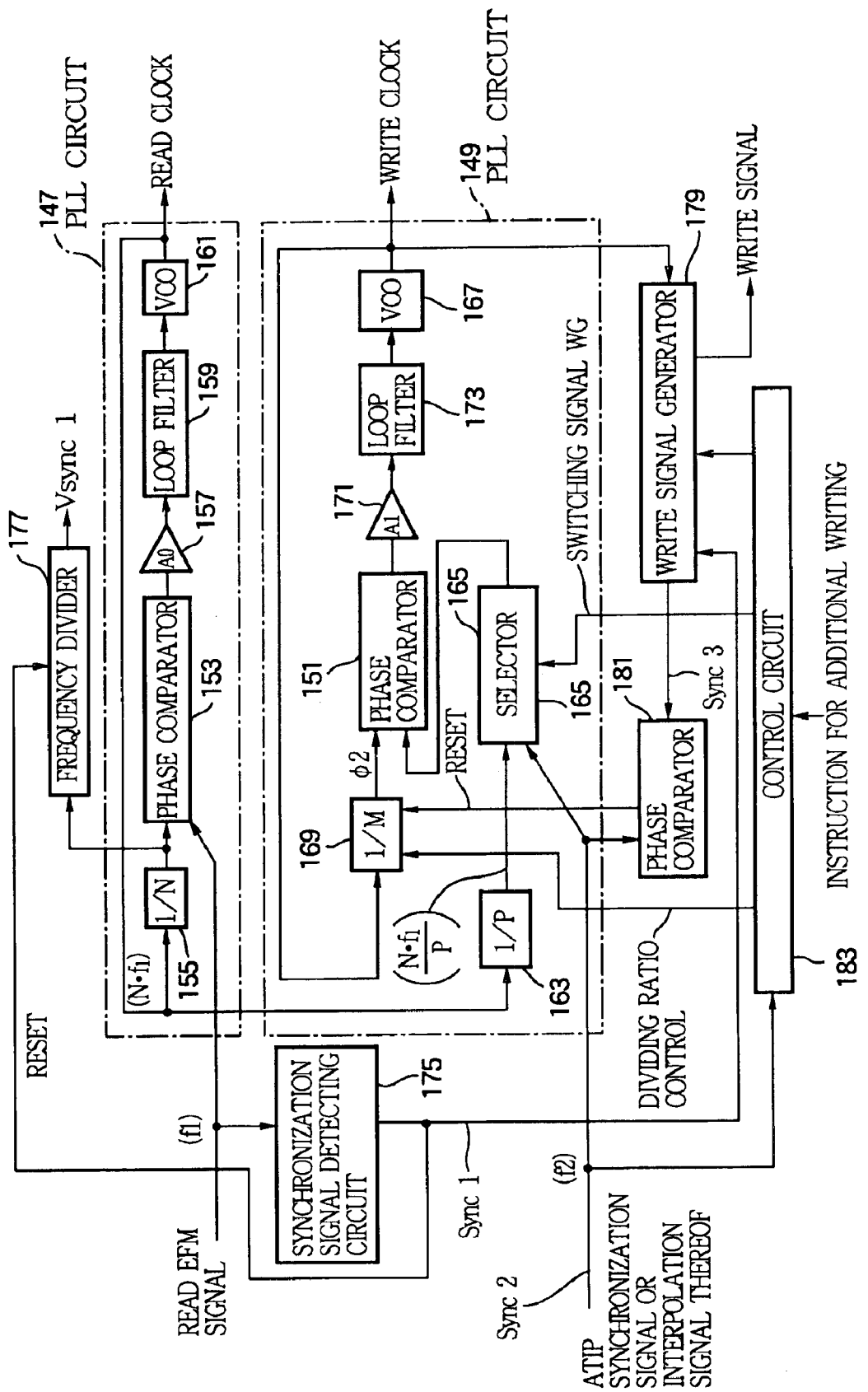
FIG. 9 is a block diagram showing the configuration of an essential part of a third embodiment of the apparatus for recording onto a recording medium in accordance with the present invention.

A third embodiment in which the present invention has been applied to recording in a CD-R/RW disc will be described. FIG. 9 shows the configuration of an essential section of a CD-R/RW drive to which the present invention has been applied. In this, a read clock producing phase-locked loop circuit 147 and a write clock producing phase-locked loop circuit 149 are separately constructed. The write clock producing phase-locked loop circuit 149 has one control loop, and the input of its phase comparator 151 is switched.

The phase-locked loop circuit 147 will be described. A phase comparator 153 compares the phase of a read EFM signal read from the CD-R/RW disc and the phase of a signal obtained by dividing, in a predetermined manner, an oscillation clock of a VCO 161 by a frequency divider 155 constructed by a counter or the like. An amplifier 157 imparts a predetermined gain A0 to an output of the phase comparison, and the output is supplied to a control input terminal of the VCO 161 through the intermediary of a loop filter 159 to control the oscillation frequency and phase thereof. This causes the VCO 161 to issue a read clock synchronized with a bit clock of the read signal. Using the read clock as an operating clock, normal reproduction and the reproduction of a read signal before reaching an additional writing position are performed.

The phase-locked loop circuit 149 will be described. A frequency divider 163 divides a read clock in a predetermined manner. A selector 165 switches between an output signal of the frequency divider 163 and an ATIP synchronization signal Sync 2 by a switching signal WG, and applies it to a phase comparator 151. More specifically, the output signal of the frequency divider 163 is selected before the additional writing position is reached, while the ATIP synchronization signal Sync 2 (if the synchronization signal is missing, then an interpolation signal produced by counting one cycle of synchronization signal from the preceding synchronization signal) is selected and supplied to the phase comparator 151 after the additional writing position is reached. The phase comparator 151 compares the phase of the signal selected by the selector 165 and the phase of the signal obtained by dividing, in a predetermined manner, the oscillation clock of a VCO 167 by a frequency divider 169 constructed by a counter or the like. A predetermined gain A1 is imparted to the phase comparison output by an amplifier 171, and supplied to a control input terminal of the VCO 167 through the intermediary of a loop filter 173 to control the oscillation frequency and phase thereof. This causes the VCO 167 to issue a write clock synchronized to the signal selected by the selector 165. Using the write clock as an operating clock, a write signal is generated.

To perform additional writing, reading is started from a position before the recording end of previous information, and the read signal is reproduced using a read clock issued from the VCO 161 of the phase-locked loop circuit 147. At this time, the phase-locked loop circuit 149 first selects the output signal of the frequency divider 163 by the selector 165 as the input to the phase comparator 151, then generates a write signal in synchronization with a clock, which is issued from the VCO 167, at a timing when the read position reaches the recording end of the previous information. A laser beam of an optical pickup is modulated by the write signal to start writing, then the input to the phase comparator 151 is switched by the selector 165 to the ATIP synchronization signal Sync 2. In this manner, the additional writing is performed. Spindle control is carried out on the basis of the read clock or a wobble signal or the ATIP synchronization signal Sync 2 before the additional writing position is reached, then carried out on the basis of the wobble signal or the ATIP synchronization signal Sync 2 after the additional writing position is reached. A spindle motor is phase-locked loop-controlled so that these signals are obtained at predetermined frequencies.

The dividing ratios of the frequency dividers 155 and 169 are set to appropriate values N and M, respectively. When the bit clock frequency of a read EFM signal is a standard value f1, the oscillation frequency of the VCO 161 is controlled to N·f1, and the oscillation clock of the VCO 161 is supplied to the frequency divider 163. A dividing ratio P of the frequency divider 163 is set to N·f1/f2 so that its division output is equal to a frequency standard value f2 of the ATIP synchronization signal Sync 2. Thus, the oscillation frequency of the VCO 167 does not fluctuate when the output of the selector 165 is switched from the output of the frequency divider 163 to the ATIP synchronization signal Sync 2 at the additional writing position. At the same time when the output of the selector 165 is changed from the output of the frequency divider 163 over to the ATIP synchronization signal Sync 2, the frequency divider 169 is reset at the timing of the ATIP synchronization signal Sync 2. Thus, when the output of the selector 165 is switched to the ATIP synchronization signal Sync 2 after the additional writing position is reached, an increase in the phase comparison output of the phase comparator 151 will be restrained, thus restraining the fluctuation in the frequency and phase of the oscillation clocks of the VCO 167.

A synchronization signal detecting circuit 175 detects a sub code frame synchronization signal Sync 1 from the read EFM signal. A frequency divider 177 divides, in a predetermined manner, an output signal of the frequency divider 155 to produce an interpolation signal of the synchronization signal Sync 1, and counts one cycle of the synchronization signal Sync 1 from the detection timing of the synchronization signal Sync 1 so as to produce an interpolation signal Vsync 1. A write signal generator 179 generates a write signal in synchronization with an oscillation clock of the VCO 167. A sub code frame synchronization of the write signal generator 179 is reset by the sub code frame synchronization signal Sync 1 detected from the read EFM signal before an additional writing position is reached. After the additional writing position is reached, the write signal generator 179 counts the oscillation clocks of the VCO 167 and produces a sub code frame synchronization by itself. From the write signal generator 179, a synchronization signal Sync 3 indicating the sub code frame synchronization is output. After the additional writing position is reached and the loop switching is performed, a phase comparator 181 compares the phase of the ATIP synchronization signal Sync 2 with the phase of the sub code frame synchronization signal Sync 3 of the write signal generator 179, and slightly changes the dividing ratio M of the frequency divider 169 to gradually reduce the phase difference (at a cycle later than the response time of the phase-locked loop circuit 149). This gradually reduces the phase deviation of the sub code frame synchronization signal Sync 3 of the write signal with respect to the ATIP synchronization signal Sync 2 after loop switching is made.

A control circuit 183 implements control necessary for additional writing on respective constituents when it receives an instruction for additional writing. The operation for the additional writing under the control of the control circuit 183 may be performed in the same manner as shown by the flowchart of FIG. 6 and the time chart of FIG. 7 described above {however, in FIG. 7, "Loop used in phase-locked loop circuit 60" should read "Selection by the selector 165", "Control loop 66" should read "Output of the frequency divider 163", and "Control loop 68" should read "ATIP synchronization signal Sync 2" in (g), and "Frequency divider 80" should read "Frequency divider 169" in (h)}.

In the foregoing embodiments, the descriptions have been given of the cases where the present invention has been applied to recording in the CD-R/RW disc. The present invention, however, can be also applied to the recording in various types of DVD discs, including DVD-Rs, DVD-RAMs, DVD-RWs, and DVD+RWs, and a variety of types of recording media, such as magneto-optical discs, magnetic discs, and magnetic tapes in which pre-recorded signals have been recorded in advance along recording tracks. In the case of a DVD-R disc, the pre-pits formed in advance along a recording track correspond to pre-recorded signals.

What is claimed is:

1. A method of writing new information subsequently to an end of previous information written in a track of a record medium having a pre-recorded signal along the track, the method comprising the steps of:

reading a part of the previous information including the end thereof to generate a read signal divided into a sequence of frames;

start generating of a write signal in synchronization with a phase of the last frame of the read signal at the end of the previous information to thereby write the new information continuously from the end of the previous information; and then shifting a period of a frame of the write signal relative to a period of a synchronization signal contained in the pre-recorded signal, thereby gradually adjusting a phase of the frame of the write signal to a phase of the synchronization signal of the pre-recorded signal.

2. The method according to claim 1, wherein the reading of a part of the previous information is carried out in response to a read clock derived from the previous information, the generating of the write signal is carried out in response to a write clock derived from the pre-recorded signal, such that a number of the write clock is shifted relative to the period of the synchronization signal of the pre-recorded signal to thereby gradually adjust the phase of the frame of the write signal to the phase of the synchronization signal of the prerecorded signal.

3. An apparatus capable of writing new information subsequently to an end of previous information written in a track of a record medium embedded with a pre-recorded signal along the track, the apparatus comprising:

a phase-locked loop circuit that generates a read clock for reading of the previous information and a write clock for writing of the new information; and a control circuit that controls the phase-locked loop circuit to effect smooth continuation from the previous information to the new information, wherein the phase-locked loop circuit comprises a VCO that oscillates to generate an oscillating clock, a first phase comparator for comparing a phase of a read signal derived from the previous information with a phase of a clock signal derived from the oscillating clock so as to control the VCO based on phase-comparison between the read signal and the clock signal to thereby constitute a first loop of generating the read clock phase-locked to the read signal, a second phase comparator for comparing a phase of a synchronization signal derived from the pre-recorded signal with a phase or a clock signal derived from the oscillating clock so as to control the VCO based on phase-comparison between the synchronization signal and the clock signal to thereby constitute a second loop of generating the write clock phase-locked to the synchronization signal, the first loop and the second loop being switchable with respect to the VCO while the VCO maintaining the same frequency of the oscillating clock, and wherein the control circuit operates before starting the writing of the new information subsequent to the end of the previous information, for controlling the phase-locked loop circuit to activate the first loop to conduct the reading of a part of the previous information including the end thereof in synchronization to the read clock generated by the first loop, and then switching the phase-locked loop circuit to activate the second loop when the reading of the previous information reaches the end so as to conduct the writing of the new information in synchronization to the write clock generated by the second loop.

4. The apparatus according to claim 3, wherein the control circuit operates when switching the phase-locked loop circuit from the first loop of generating the read clock to the second loop of generating the write clock, for resetting a phase of the clock signal fed to the second phase comparator in matching with a phase of the synchronization signal derived from the pre-recorded signal.

5. The apparatus according to claim 3 further comprising a pair of amplifiers connected to respective outputs of the first loop of generating the read clock and the second loop of generating the write clock for balancing loop gains between the first loop and the second loop.

6. An apparatus capable of writing new information subsequently to an end of previous information written in a track of a record medium embedded with a pro-recorded signal along the track, the apparatus comprising:

a phase-locked loop circuit that generates a read clock for reading of the previous information and a write clock for writing of the new information, the phase-locked loop circuit comprising a VCO that oscillates to generate an oscillating clock, a first phase comparator for comparing a phase of a read signal derived from the previous information with a phase of a clock signal derived from the oscillating clock so as to control the VCO based on phase-comparison between the read signal and the clock signal to thereby constitute a first loop of generating the read clock phase-locked to the read signal, a second phase comparator for comparing a phase of a synchronization signal derived from the pre-recorded signal with a phase of a clock signal derived from the oscillating clock so as to control the VCO based on phase-comparison between the synchronization signal and the clock signal to thereby constitute a second loop of generating the write clock phase-locked to the synchronization signal, the first loop and the second loop being switchable with respect to the VCO while the VCO maintaining the same frequency of the oscillating clock;

a detecting circuit that detects the phase of each frame of the read signal derived from the previous information;

a generating circuit that generates a write signal representative of the new information in synchronization to the oscillating clock generated from the VCO; and a control circuit that operates before starting the writing of the new information subsequent to the end of the previous information for controlling the phase-locked loop circuit to activate the first loop to conduct the reading of a part of the previous information including the end thereof in synchronization to the read clock generated by the first loop, and then operates when the reading of the previous information reaches the end for controlling the generating circuit to generate the write signal in matching with the phase of the last frame of the read signal detected at the end of the previous information to thereby start the writing of the new information in continuation from the end of the previous information and for switching the phase-locked loop circuit to activate the second loop.

7. The apparatus according to claim 6, further comprising a divider for dividing the oscillating clock fed from the VCO by a variable division ratio to produce the clock signal fed to the second phase comparator, a third phase comparator for comparing a phase of each frame of the write signal with a phase of the synchronization signal derived from the pre-recorded signal to determine a phase difference between the write signal and the synchronization signal, and an adjuster operative after the phase-locked loop circuit is switched from the first loop of generating the read Clock to the second loop of generating the write clock for adjusting the variable division ratio of the divider so as to gradually absorb the phase difference.

8. The apparatus according to claim 6, wherein the control circuit operates when switching the phase-locked loop circuit from the first loop of generating the read clock to the second loop of generating the write clock, for resetting a phase of the clock signal fed to the second phase comparator in matching with a phase of the synchronization signal derived from the pre-recorded signal.

9. The apparatus according to claim 6, further comprising a pair of amplifiers connected to respective outputs of the first loop of generating the read clock and the second loop of generating the write clock for balancing loop gains between the first loop and the second loop.

10. An apparatus capable of writing new information subsequently to an end of previous information written in a track of a record medium embedded with a pre-recorded signal along the track, the apparatus comprising:

a read phase-locked loop circuit that generates a read clock for reading of the previous information, the read phase-locked loop circuit Comprising a first VCO that oscillates to generate an oscillating clock, a first phase comparator for comparing a phase of a read signal derived from the previous information with a phase or a clock signal derived from the oscillating clock so as to control the first VCO based on phase-comparison between the read signal and the clock signal to thereby generate the road clock phase-locked to the read signal;

a write phase-locked loop circuit that generates a write clock for writing of the new information, the write phase-locked loop circuit comprising a second VCO that oscillates to generate an oscillating clock, a second phase comparator for comparing a phase of the read clock generated by the read phase-locked loop circuit with a phase of a clock signal derived from the oscillating clock of the second VCO so as to control the second VCO based on phase-comparison between the read clock and the clock signal to thereby constitute a first loop of synchronizing the oscillating clock of the second VCO with the read clock, and a third phase comparator for comparing a phase of a synchronization signal derived from the pre-recorded signal with a phase of a clock signal derived from the oscillating clock of the second VCO so as to control the second VCO based on phase-comparison between the synchronization signal and the clock signal to thereby constitute a second loop of generating the write clock phase-locked to the synchronization signal, the first loop and the second loop of the write phase-locked loop circuit being switchable with respect to the second VCO while the second VCO maintaining the same frequency of the oscillating clock; and a control circuit that operates before starting the writing of the new information subsequent to the end of the previous information, for controlling the read phase-locked loop circuit to conduct the reading of a part of the previous information including the end thereof in synchronization to the read clock generated by the read phase-locked loop circuit while controlling the write phase-locked loop circuit to activate the first loop for synchronizing the oscillating clock of the second VCO with the read clock, and then switching the write phase-locked loop circuit to activate the second loop when the reading of the previous information reaches the end so as to conduct the writing of the new information in synchronization to the write clock generated by the second loop of the write phase-locked loop circuit.

11. The apparatus according to claim 10, wherein the control circuit operates when switching the write phase-locked loop circuit from the first loop of synchronizing the oscillating clock to the second loop of generating the write clock, for resetting a phase of the clock signal fed to the third phase comparator in matching with a phase of the synchronization signal derived from the pre-recorded signal.

12. The apparatus according to claim 10, further comprising a pair of amplifiers connected to respective outputs of the first loop of synchronizing the oscillating clock and the second loop of generating the write clock for balancing loop gains between the first loop and the second loop.

13. An apparatus capable of writing new information subsequently to an end of previous information written in a track of a record medium embedded with a pre-recorded signal along the track, the apparatus comprising:

a read phase-locked loop circuit that generates a read clock for reading of the previous information, the read phase-locked loop circuit comprising a first VCO that oscillates to generate an oscillating clock, a first phase comparator for comparing a phase of a read signal derived from the previous information with a phase of a clock signal derived from the oscillating clock so as to control the first VCO based on phase-comparison between the read signal and the clock signal to thereby generate the read clock phase-locked to the read signal;

a write phase-locked loop circuit that generates a write clock for writing of the new information, the write phase-locked loop circuit comprising a second VCO that oscillates to generate an oscillating cloak, a second phase comparator for comparing a phase of the read clock generated by the read phase-locked loop circuit with a phase of a clock signal derived from the oscillating clock of the second VCO so as to control the second VCO based on phase-comparison between the read clock and the clock signal to thereby constitute a first loop of synchronizing the oscillating clock of the second VCO with the read clock, and a third phase comparator for comparing a phase of a synchronization signal derived from the pre-recorded signal with a phase of a clock signal derived from the oscillating clock of the second VCO so as to control the second VCO based on phase-comparison between the synchronization signal and the clock signal to thereby constitute a second loop of generating the write clock phase-locked to the synchronization signal, the first loop and the second loop of the write phase-locked loop circuit being switchable with respect to the second VCO while the second VCO maintaining the same frequency of the oscillating clock;

a detecting circuit that detects the phase of each frame of the read signal derived from the previous information;

a generating circuit that generates a write signal representative of the new information in synchronization to the oscillating clock generated from the second VCO; and a control circuit that operates before starting the writing of the new information subsequent to the end of the previous information for controlling the read phase-locked loop circuit to conduct the reading of a part of the previous information including the end thereof in synchronization to the read clock generated by the read phase-locked loop circuit while controlling the write phase-locked loop circuit to activate the first loop for synchronizing the oscillating clock of the second VCO to the read clock, and then operates when the reading of the previous information reaches the end for controlling the generating circuit to generate the write signal in matching with the phase of the last frame of the read signal detected at the end of the previous information to thereby start the writing of the new information in continuation from the end of the previous information and for switching the write phase-locked loop circuit to activate the second loop of generating the write clock.

14. The apparatus according to claim 13, further comprising a divider for dividing the oscillating clock fed from the second VCO by a variable division ratio to produce the clock signal fed to the third phase comparator, a fourth phase comparator for comparing a phase of each frame of the write signal with a phase of the synchronization signal derived from the pre-recorded signal to determine a phase difference between the write signal and the synchronization signal, and an adjuster operative after the write phase-locked loop circuit is switched from the first loop of synchronizing the oscillating clock to the second loop of generating the write clock for adjusting the variable division ratio of the divider so as to gradually absorb the phase difference.

15. The apparatus according to claim 13, wherein the control circuit operates when switching the write phase-locked loop circuit from the first loop of synchronizing the oscillating clock to the second loop of generating the write clock, for resetting a phase of the clock signal fed to the third phase comparator in matching with a phase of the synchronization signal derived from the pre-recorded signal.

16. The apparatus according to claim 13, further comprising a pair of amplifiers connected to respective outputs of the first loop of synchronizing the oscillating clock and the second loop of generating the write clock for balancing loop gains between the first loop and the second loop.

17. An apparatus capable of writing new information subsequently to an end of previous information written in a track of a record medium embedded with a pre-recorded signal along the track, the apparatus comprising:

a read phase-locked loop circuit that generates a read clock for reading of the previous information, the read phase-locked loop circuit comprising a first VCO that oscillates to generate an oscillating clock, a first phase comparator for comparing a phase of a read signal derived from the previous information with a phase of a clock signal derived from the oscillating clock so as to control the first VCO based on phase-comparison between the read signal and the clock signal to thereby generate the read clock phase-locked to the read signal;

a write phase-locked loop circuit that generates a write clock for writing of the new information, the write phase-locked loop circuit comprising a second VCO that oscillates to generate an oscillating clock, a selector for selecting one of a synchronization signal derived from the pre-recorded signal and a divisional signal frequency-divided from the read clock at the same frequency as the synchronization signal, and a second phase comparator for comparing a phase of the selected one of the synchronization signal and the divisional signal with a phase of a clock signal derived from the oscillating clock of the second VCO so as to control the second VCO based on phase-comparison between the selected signal and the clock signal to thereby generate the write clock phase-locked to the selected signal; and a control circuit that operates before starting the writing of the new information subsequent to the end of the previous information, for controlling the read phase-locked loop circuit to conduct the reading of a part of the previous information including the end thereof in synchronization to the read clock generated by the read phase-locked loop circuit while controlling the selector of the write phase-locked loop circuit to select the divisional signal of the read clock for synchronizing the oscillating clock of the second VCO with the read clock, and then controlling the selector of the write phase-locked loop circuit to select the synchronization signal when the reading of the previous information reaches the end so as to conduct the writing of the new information in synchronization to the write clock generated by the write phase-locked loop circuit.

18. The apparatus according to claim 17, wherein the control circuit operates when switching the selector of the write phase-locked loop circuit from the divisional signal of the read clock to the sync clock of the pre-recorded signal, for resetting a phase of the clock signal fed to the second phase comparator in matching with a phase of the synchronization signal derives from the pre-recorded signal.

19. An apparatus capable of writing new information subsequently to an end of previous information written in a track of a record medium embedded with a pre-recorded signal along the track, the apparatus comprising:

a read phase-locked loop circuit that generates a read clock for reading of the previous information, the read phase-locked loop circuit comprising a first VCO that oscillates to generate an oscillating clock, a first phase comparator for comparing a phase of a read signal derived from the previous information with a phase of a clock signal derived from the oscillating clock so as to control the first VCO based on phase-comparison between the read signal and the clock signal to thereby generate the read clock phase-locked to the read signal;

a write phase-locked loop circuit that generates a write clock for writing of the new information, the write phase-locked loop circuit comprising a second VCO that oscillates to generate an oscillating clock, a selector for selecting one of a synchronization signal derived from the prerecorded signal and a divisional signal frequency-divided from the read clock at the same frequency as the synchronization signal, and a second phase comparator for comparing a phase or the selected one of the synchronization signal and the divisional signal with a phase of a clock signal derived from the oscillating clock of the second VCO so as to control the second VCO based on phase-comparison between the selected signal and the clock signal to thereby generate the write clock phase-locked to the selected signal;

a detecting circuit that detects the phase of each frame of the read signal derived from the previous information;

a generating circuit that generates a write signal representative of the new information in synchronization to the oscillating clock generated from the second VCO; and a control circuit that operates before starting the writing of the new information subsequent to the end of the previous information for controlling the read phase-locked loop circuit to conduct the reading of a part of the previous information including the end thereof in synchronization to the read clock generated by the read phase-locked loop circuit while controlling the selector of the write phase-locked loop circuit to select the divisional signal of the read clock for synchronizing the oscillating clock of the second VCO with the read clock, and then operates when the reading of the previous information reaches the end for controlling the generating circuit to generate the write signal in matching with the phase of the last frame of the read signal detected at the end of the previous information to thereby start the writing of the new information in continuation from the end of the previous information and then controlling the selector of the write phase-locked loop circuit to select the synchronization signal for synchronization of the write clock.

20. The apparatus according to claim 19, further comprising a divider for dividing the oscillating clock fed from the second VCO by a variable division ratio to produce the clock signal fed to the second phase comparator, a third phase comparator for comparing a phase of each frame of the write signal with a phase of the synchronization signal derived from the pre-recorded signal to determine a phase difference between the write signal and the synchronization signal, and an adjuster operative after the selector of the write phase-locked loop circuit is switched from the divisional signal of the read clock to the synchronization signal of the prerecorded signal for adjusting the variable division ratio of the divider so as to gradually absorb the phase difference.

21. The apparatus according to claim 19, wherein the control circuit operates when switching the selector of the write phase-locked loop circuit from the divisional signal of the read clock to the sync clock of the pre-recorded signal, for resetting a phase of the clock signal fed to the second phase comparator in matching with a phase of the synchronization signal derived from the pre-recorded signal.

* * * * *